(12) United States Patent
Chang (10) Patent No.: US 8,299,711 B2
(45) Date of Patent: Oct. 30, 2012

(54) PROTECTION CIRCUIT OF T8 LED LIGHTING TUBE

(75) Inventor: Bailey Chang, Taipei (TW)

(73) Assignee: Azurelighting Technologies, Inc., Taipei (TW)

( * ) Notice: Subject to any disclaimer, the term of this patent is extended or adjusted under 35 U.S.C. 154(b) by 224 days.

(21) Appl. No.: 12/882,504

(22) Filed: Sep. 15, 2010

(65) Prior Publication Data

US 2012/0062114 A1    Mar. 15, 2012

(51) Int. Cl.
*H01J 13/46* (2006.01)

(52) U.S. Cl. .................. 315/41; 315/42; 315/56; 315/59

(58) Field of Classification Search .............. 315/41–50, 315/56–63
See application file for complete search history.

(56) References Cited

U.S. PATENT DOCUMENTS

2011/0058365 A1* 3/2011 Osawa ...................... 362/217.01
2011/0260614 A1* 10/2011 Hartikka et al. ................ 315/51
2012/0062134 A1* 3/2012 Kou et al. ...................... 315/205

* cited by examiner

*Primary Examiner* — Tuyet Thi Vo
(74) *Attorney, Agent, or Firm* — Rosenberg, Klein & Lee (57) ABSTRACT

A protection circuit is provided for a T8 LED lighting tube, including at least two power transmission connectors and at least two rectification circuits. The power transmission connectors are respectively mounted to opposite ends of the T8 LED tube and each has at least two contacts that are respectively engageable with tube retention connectors formed on opposite ends of a T8 fluorescent light fixture to receive an external AC power. Each rectification circuit is composed of at least one rectifier semiconductor and the two rectification circuits are respectively connected to the contacts of the two power transmission connectors. The rectification semiconductors of the two rectification circuits are connected to achieve a reverse flow prevention function, so that the rectification circuits can supply a DC power to a light source load contained inside the T8 LED tube without allowing an electrical current reversely flowing to a starter of the T8 fluorescent light fixture no matter what sequence and direction that contacts take for connection with the tube retention connectors of the T8 fluorescent light fixture, so as to isolate and disable the starter for protecting the light source load of the T8 LED tube.

10 Claims, 8 Drawing Sheets

PROTECTION CIRCUIT OF T8 LED LIGHTING TUBE

BACKGROUND OF THE INVENTION

1. Field of the Invention

The present invention relates to a protection circuit of a T8 LED (Light-Emitting Diode) lighting tube, and in particular to a circuit that achieves protection of a light source load of a T8 LED tube through at least two rectification circuits that are composed of rectifier semiconductors to realize a function of preventing a reverse flow of electrical current.

2. The Related Arts

Figure 1:
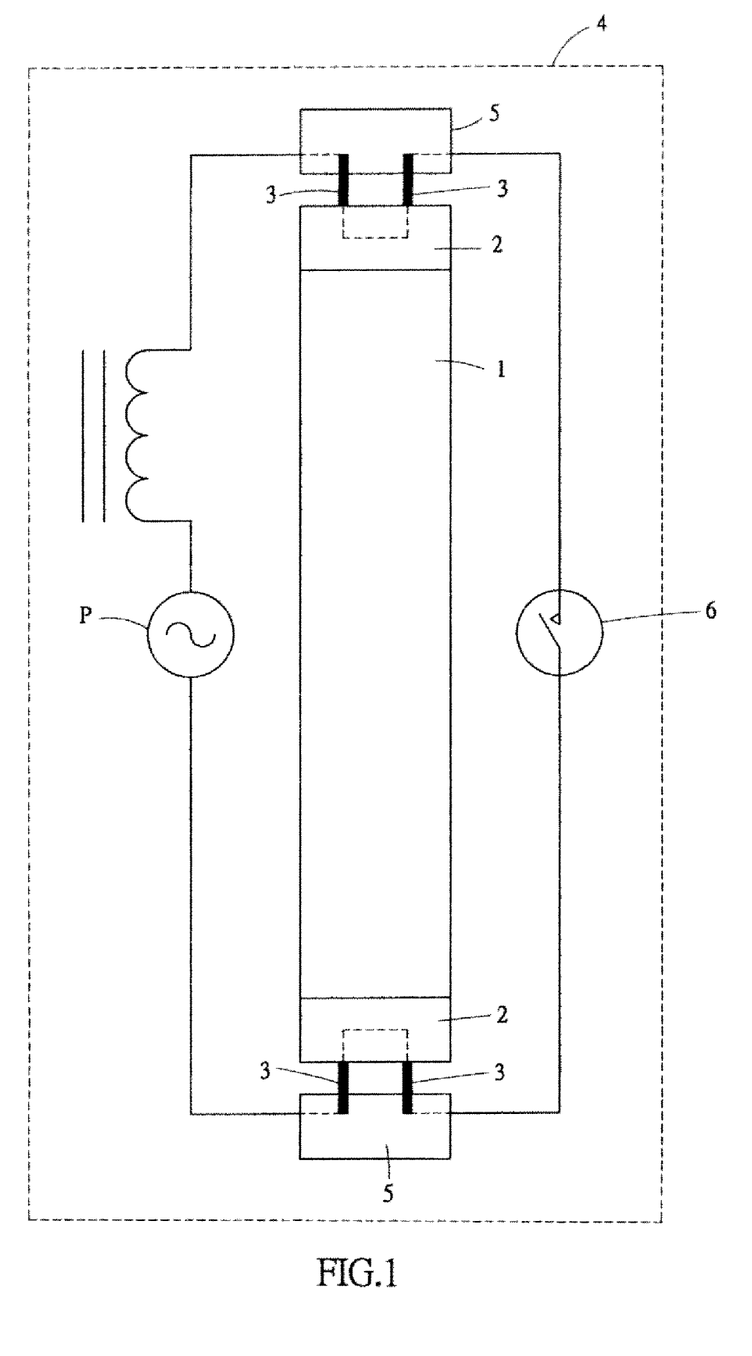
FIG. 1 is a schematic view showing a conventional connection between a T8 LED lighting tube and an existing fluorescent light fixture.

A T8 LED (Light-Emitting Diode) lighting tube is commonly used in T8 lighting facilities to serve as a replacement light source for traditional fluorescent tubes. The T8 LED lighting tubes, although helpful in reducing power consumption, are of long-existing apparent drawbacks regarding connection with power supply. For example, as shown in FIG. 1 of the attached drawings, a conventional T8 LED tube 1 has two opposite ends each forming a connector 2. Each connector 2 comprises two conductive pins 3 for removable and electrical engagement with a corresponding connector 5 of a T8 fluorescent light fixture 4 to establish electrical connection of the pins 3 with an alternating current power source P of a T8 fluorescent light fixture 4, so that alternating current from for example electric main can be supplied to light the T8 LED tube 1.

A conventional fluorescent tube receives alternating current is a polarity free manner, meaning the two pins of the fluorescent tube are of no difference from each other; yet this is not the case of light-emitting diodes. In order to make a T8 LED tube connectable to a T8 light fixture in the same polarity free manner as the conventional fluorescent tubes, meaning the two pins 3 of the two connectors 2 of the T8 LED tube 1 are allowed to be arbitrarily mounted to any one of the fixture connectors 5 of the light fixture, a commonly used solution is to short the two pins 3 of each tube connector 2. This makes the pins 3 of the two tube connectors 2 connecting in parallel to a starter 6 of the T8 fluorescent light fixture 4. Consequently, the starter 6 will be enabled when alternating current flows from an electric main to the T8 fluorescent light fixture 4. The starter 6 generates a high voltage surge that is transmitted through the pins 3 of the tube connectors 2 to T8 LED tube 1. Since the T8 LED tube 1 is not designed to operate in the same way as a fluorescent tube that requires preheating to excite ionization of inert gas to induce electric discharge for emission of light, the high voltage surge will damage the T8 LED tube 1 and leads to deterioration of performance and lifespan of components of the LED lighting.

A known solution for the problem of damage of the T8 LED tube 1 caused by the high voltage surge generated by the enablement of the starter of the T8 fluorescent light fixture 4 is to remove the starter 6 from the fluorescent light fixture 4. This solution is impractical in that a user often forgets to remove the starter after replacing the fluorescent tube with an LED tube and eventually leads to undesired damage of the LED lighting tube 1. Further, if the starter is correctly removed from a fluorescent light fixture for installation of an LED tube, there is more trouble that the starter must be re-installed in case the LED tube is to be removed and a fluorescent tube is to be used again. This is certainly troublesome and cumbersome. Another feasible solution is to install a device that suppresses or eliminates surge in the T8 LED tube 1. This, apparently, adds expenses to the manufacturing costs of the T8 LED tubes, making it economically impractical and thus of no industrial value.

References of prior art are known, such as Taiwan Utility Model M368749, which discloses an LED lighting fixture, wherein one or two sets of bridge rectifiers are connected between two first power input terminals or second power input terminals of an end cap of the same side, in order to eliminate the risk of burning out due to incorrect connection when two or more LED lighting fixture are connected in serial. However, no isolation or disablement is realized on the starter of the fluorescent light, fixture. The connection between the first or second power input terminals and an alternating current power supply of the fluorescent light tube shown in the prior art LED lighting fixture indicates that the starter of the fluorescent light fixture will be enabled and put into operation in order to supply the alternating current for operation of the first and second bridge rectifiers. This causes the same problem discussed above that the T8 LED tube 1 is susceptible to damage caused by high voltage surge induced by the operation of the starter, leading to deterioration of performance and lifespan of the components of the LED lighting fixture.

SUMMARY OF THE INVENTION

In the conventional way of using a T8 LED (Light-Emitting Diode) tube in an existing T8 fluorescent light fixture, in order to allow an alternating current supplied from an electric main to be provided in a polarity-free manner to the LED tube, the pins of the same end of the fluorescent light fixture are directly shorted or is connected with a bridge rectifier, both solutions leading to the application of high voltage surges, which are induced by the enablement of a starter of the fluorescent light fixture, to the T8 LED tube, causing undesired damages of the LED tube and/or deterioration of the performance and lifespan of the LED light fixture; or alternatively, the starter must be removed, leading to troubles and inconvenience of using T8 LED tubes.

Thus, it is desired to provide a protection circuit, which allows an alternating current to be supplied to a T8 LED tube mounted in an existing T8 fluorescent light fixture in a directionless manner, automatically disables a starter that is originally integrated with the T8 fluorescent light fixture regardless whether the starter is kept in the light fixture or has been removed, so as to effective protect the T8 LED tube from damage caused by high voltage surges and improve the reliability and lifespan of the T8 LED tube used in an existing fluorescent light fixture.

To overcome the problems and drawbacks of the conventional devices, the present invention provides a protection circuit for a T8 LED lighting tube, comprising at least two power transmission connectors and at least two rectification circuits. The power transmission connectors are respectively mounted to opposite ends of the T8 LED tube and each has at least two contacts that are respectively engageable with tube retention connectors formed on opposite ends of a T8 fluorescent light fixture to receive an external AC power. Each rectification circuit is composed of at least one rectifier semiconductor and the two rectification circuits are respectively connected to the contacts of the two power transmission connectors. The rectification semiconductors of the two rectification circuits are connected to achieve a function of preventing a reverse flow of electrical current, so that the rectification circuits can supply a DC power to a light source load contained inside the T8 LED tube without allowing an electrical current reversely flowing to a starter of the T8 fluorescent light fixture no matter what sequence and direction that contacts take for connection with the tube retention connectors of the T8 fluorescent light fixture, so as to isolate and disable the starter for protecting the light source load of the T8 LED tube.

The effectiveness of the protection circuit of the present invention is that with a function that prevents a reverse flow of electrical current realized through interconnection between rectifier semiconductors of at least two rectification circuits, the contacts of power transmission connectors of a T8 LED tube can be connected to a T8 fluorescent light fixture in a polarity-free manner and further, the starter of the T8 fluorescent light fixture is isolated and disabled. Thus, there is no need for a user to remove the starter from an existing fluorescent light fixture and circuit damage or deterioration of performance of a T8 LED tube mounted to an existing fluorescent light fixture caused by a starter left in the light fixture can be completely eliminated so that the problem of shortening of lifespan due to such reasons is overcome and the reliability and lifespan of a T8 LED tube are improved. Further, the protection function according to the present invention can be realized through low-cost half-wave or full-wave rectification circuits, so that, as compared to the expensive surge suppressing or eliminating devices, the present invention can effectively reduces the manufacturing costs and improves the industrial value.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 2:
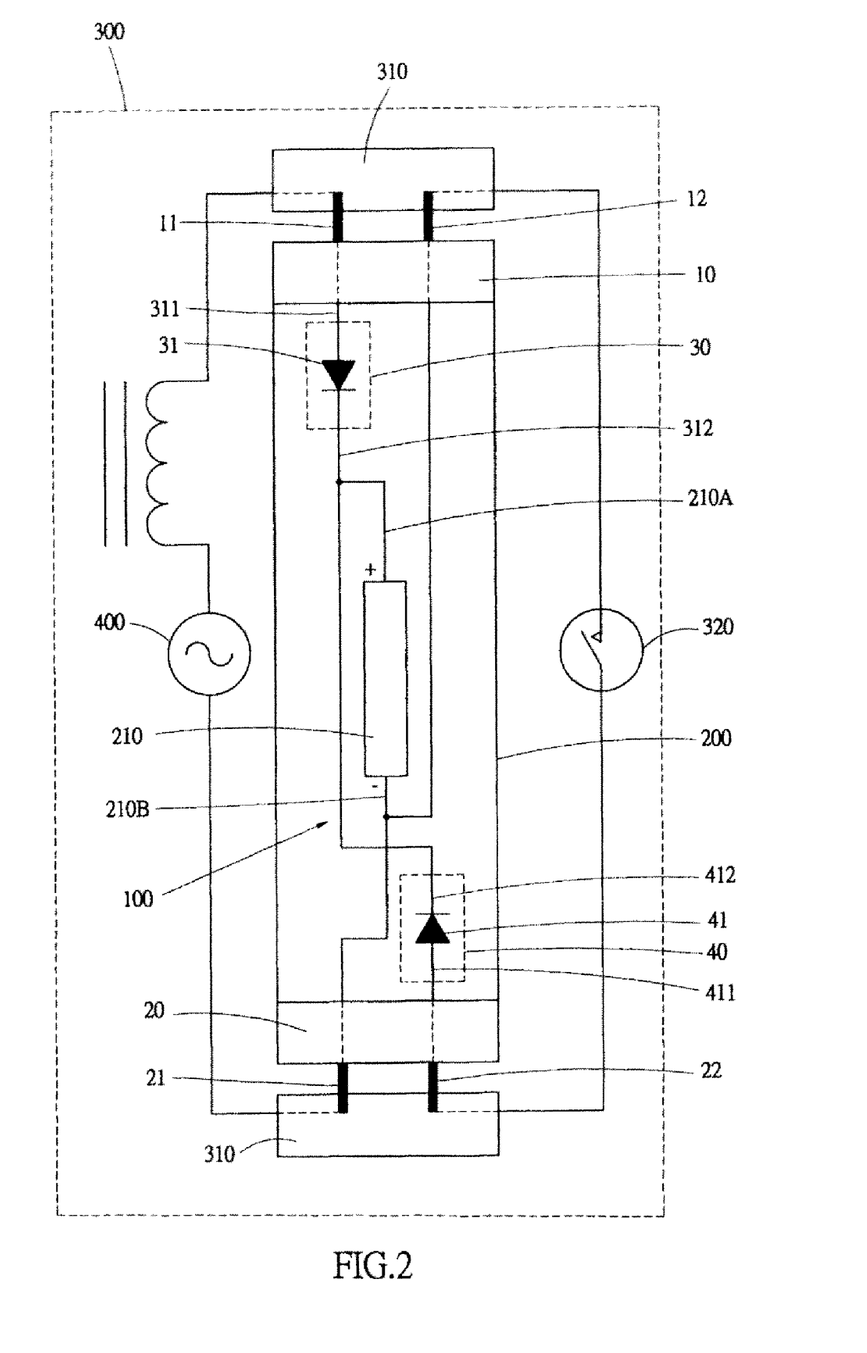
FIG. 2 is a circuit diagram showing a protection circuit of T8 LED tube according to a first embodiment of the present invention.

With reference to the drawings and in particular to FIG. 2, a protection circuit constructed in accordance with a first embodiment of the present invention, generally designated at 100, is provided for protecting a T8 LED lighting tube, which is designated at 200 in the drawing. The protection circuit 100 comprises at least two power transmission connectors 10, 20, which are respectively mounted to opposite ends of the T8 LED tube 200. The power transmission connector 10 comprises at least two contacts 11, 12, and the power transmission connector 20 comprises at least two contacts 21, 22. The contacts 11, 12 and the contacts 21, 22 have exposed portions that respectively engage, such as being fit into, tube retention connectors 310, 320 formed on opposite ends of a T8 fluorescent light fixture 300 to establish electrical connection with an alternating current (AC) power supply 400 of for example an electric main.

The protection circuit 100 comprises at least two rectification circuits 30, 40. The rectification circuit 30 is constituted by at least one rectifier semiconductor 31, and the rectification circuit 40 is constituted by at least one rectifier semiconductor 41. In the first embodiment of the present invention, the rectification circuits 30, 40 are formed of half-wave rectification circuits, which are taken as an example for explanation and the rectifier semiconductors 31, 41 are rectifier diodes. It is apparent to those having ordinary skills that other equivalent rectification circuits and rectification devices/elements are well within the scope of the present invention.

The two rectification circuits 30, 40 are respectively connected to the contact 11 of the power transmission connector 10 and the contact 22 of the power transmission connector 20, and the rectifier semiconductor 31 of the rectification circuit 30 and the rectifier semiconductor 41 of the rectification circuit 40 are connected to each other to realize a function of preventing reverse flow of electrical current. As shown in FIG. 2, the rectifier semiconductor 31 has an anode terminal 311 connected to the contact 11, while an anode terminal 411 of the rectifier semiconductor 41 is connected to the contact 22. The rectifier semiconductor 31 has a cathode terminal 312 that is connected to a cathode terminal 412 of the rectifier semiconductor 41 and further connected to a positive power terminal 210A of a light source load 210 contained in the T8 LED tube 200. The light source load 210 also has a negative power terminal 210B connected to the contact 12 of the power transmission connector 10 and the contact 21 of the power transmission connector 20. In other words, the rectification circuits 30, 40 are arranged at a position that connects between diagonally located contacts 11, 22 of the two power transmission connectors 10, 20, and the light source load 210 is connected between the two rectification circuits 30, 40.

The connection arrangement among the power transmission connectors 10, 20, the rectifier semiconductor 31 of the rectification circuit 30, the rectifier semiconductor 41 of the rectification circuit 40, and the light source load 210 is not limited to what shown FIG. 2.

For the protection circuit 100 shown in FIG. 2, no matter what sequence and direction that the contacts 11, 12 of the power transmission connector 10 and the contacts 21, 22 of the power transmission connector 20 take for connection with the tube retention connectors 310 of the opposite ends of the T8 fluorescent light fixture 300, the rectification circuit 30 (or 40) can supplied a direct current (DC) power that is obtained through half-wave rectification to the positive power terminal 210A and the negative power terminal 210B of the light source load 210 of the T8 LED tube 200. FIG. 2 demonstrates half-wave rectified DC power is supplied from the rectifier semiconductor 31 of the rectification circuit 30 to the light source load 210, and a reverse flow of electrical current is prevented by having the cathode terminal 312 of the rectifier semiconductor 31 and the cathode terminal 412 of the rectifier semiconductor 41 connected to each other so that electrical current is prevented from flowing reversely to a starter 320 of the T8 fluorescent light fixture 300, thereby realizing automatic isolation and disabling of the starter 320 for protection of the light source load 210 of the T8 LED tube 200.

Figure 3:
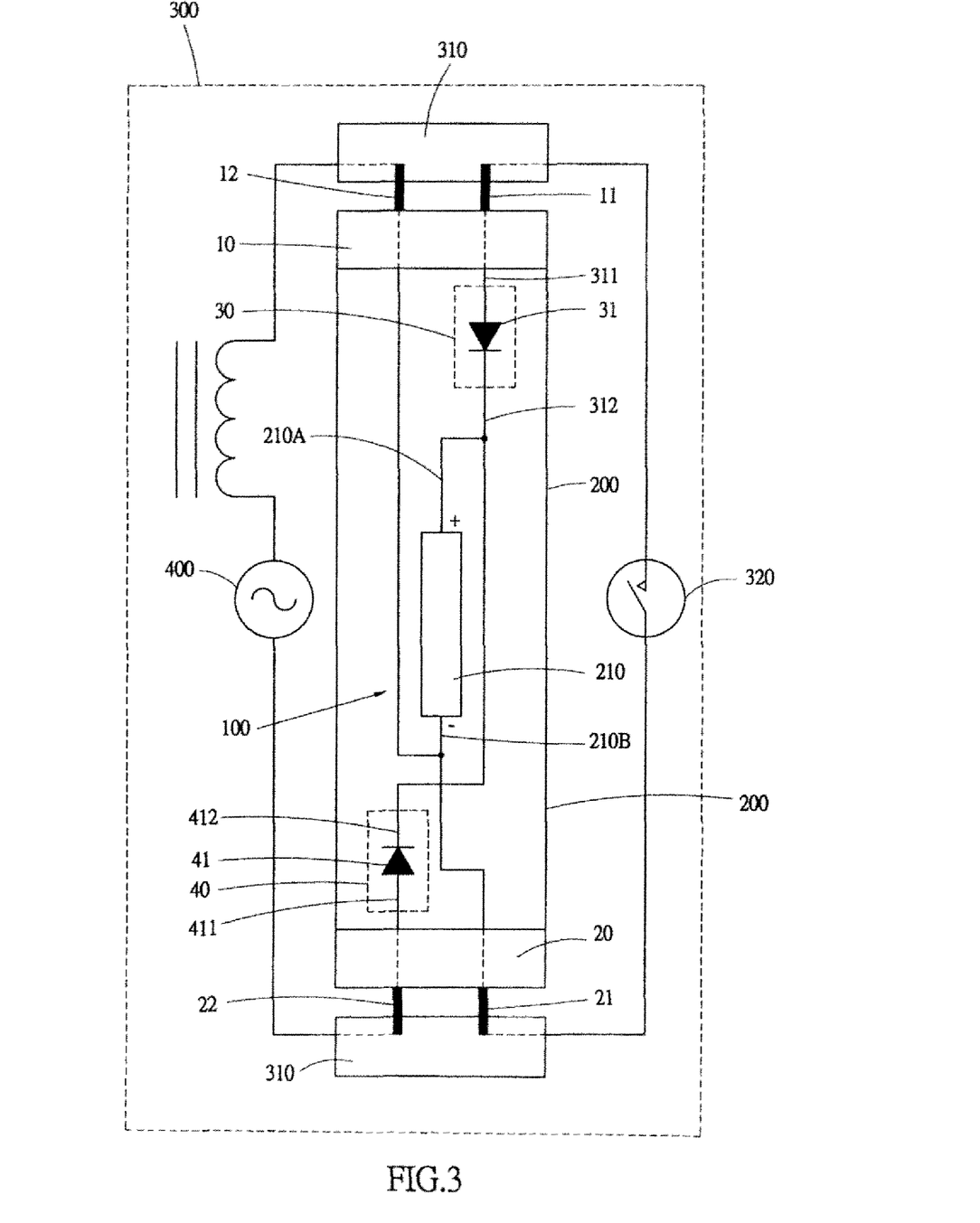
FIG. 3 is a circuit diagram showing a modified embodiment of the circuit arrangement shown in FIG. 2.

Referring also to FIG. 3, the contacts 11, 12 of the power transmission connector 10 and also the contacts 21, 22 of the power transmission connector 20 are connected in a manner opposite to that illustrated in FIG. 1 to the tube retention connectors 310 formed on the two ends of the T8 fluorescent light fixture 300. Similar to the arrangement shown in FIG. 2n, in this case, half-wave rectified DC power is supplied from the rectifier semiconductor 41 of the rectification circuit 40 to the light source load 210, and the cathode terminal 312 of the rectifier semiconductor 31 and the cathode terminal 412 of the rectifier semiconductor 41 are electrically connected to each other to form a structure that prevents a reverse flow of electrical current, realizing automatic isolation and disabling of the starter 320 for protecting the light source load 210 of the T8 LED tube 200. Similarly, when the contacts 11, 12 of the power transmission connector 10 and the contacts 21, 22 of the power transmission connector 20 are switched with each other for connection with the tube retention connectors 310 formed on the two ends of the T8 fluorescent light fixture 300, similar protection of the light source load 210 can be realized.

Figure 4:
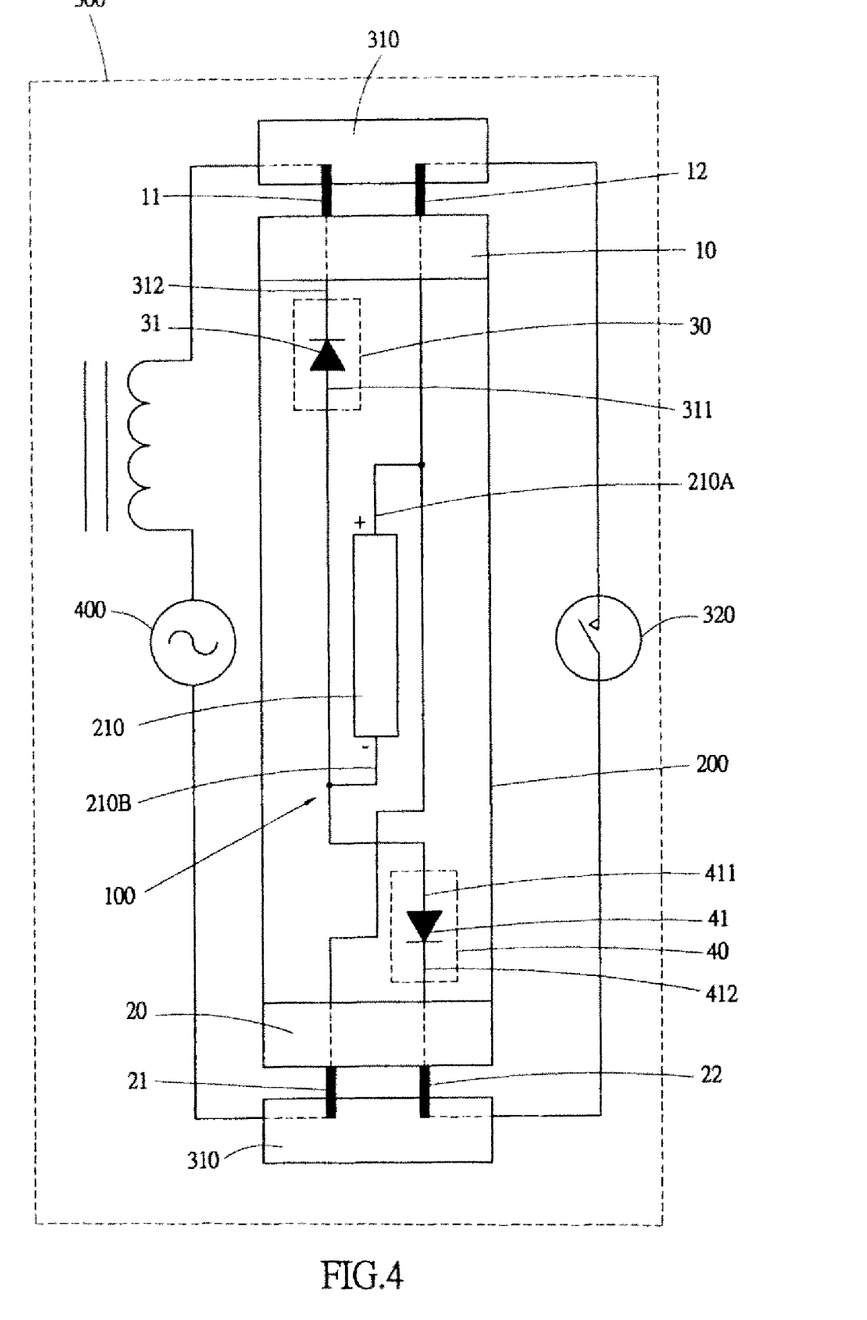
FIG. 4 is a circuit diagram showing a protection circuit of T8 LED tube according to a second embodiment of the present invention.

Referring to FIG. 4, a protection circuit 100 constructed in accordance with a second embodiment of the present invention is provided for a T8 LED lighting tube 200. The cathode terminal 312 of the rectifier semiconductor 31 of the rectification circuit 30 is connected to the contact 11, and the cathode terminal 412 of the rectifier semiconductor 41 of the rectification circuit 40 is connected to the contact 22. The anode terminal 311 of the rectifier semiconductor 31 is connected to the anode terminal 411 of the rectifier semiconductor 41 and is further connected to the negative power terminal 210B of the light source load 210 contained in the T8 LED tube 200. The positive power terminal 210A of the light source load 210 is connected to the contact 12 of the power transmission connector 10 and the contact 22 of the power transmission connector 20. Again, a half-wave rectified DC power is supplied from the rectifier semiconductor 31 of the rectification circuit 30 to the light source load 210, and a structure that prevents a reverse flow of electrical current is formed by connecting the anode terminal 311 of the rectifier semiconductor 31 with the anode terminal 411 of the rectifier semiconductor 41 to realize automatic isolation and disabling of the starter 320 for protection of the light source load 210 of the T8 LED tube 200.

Figure 5:
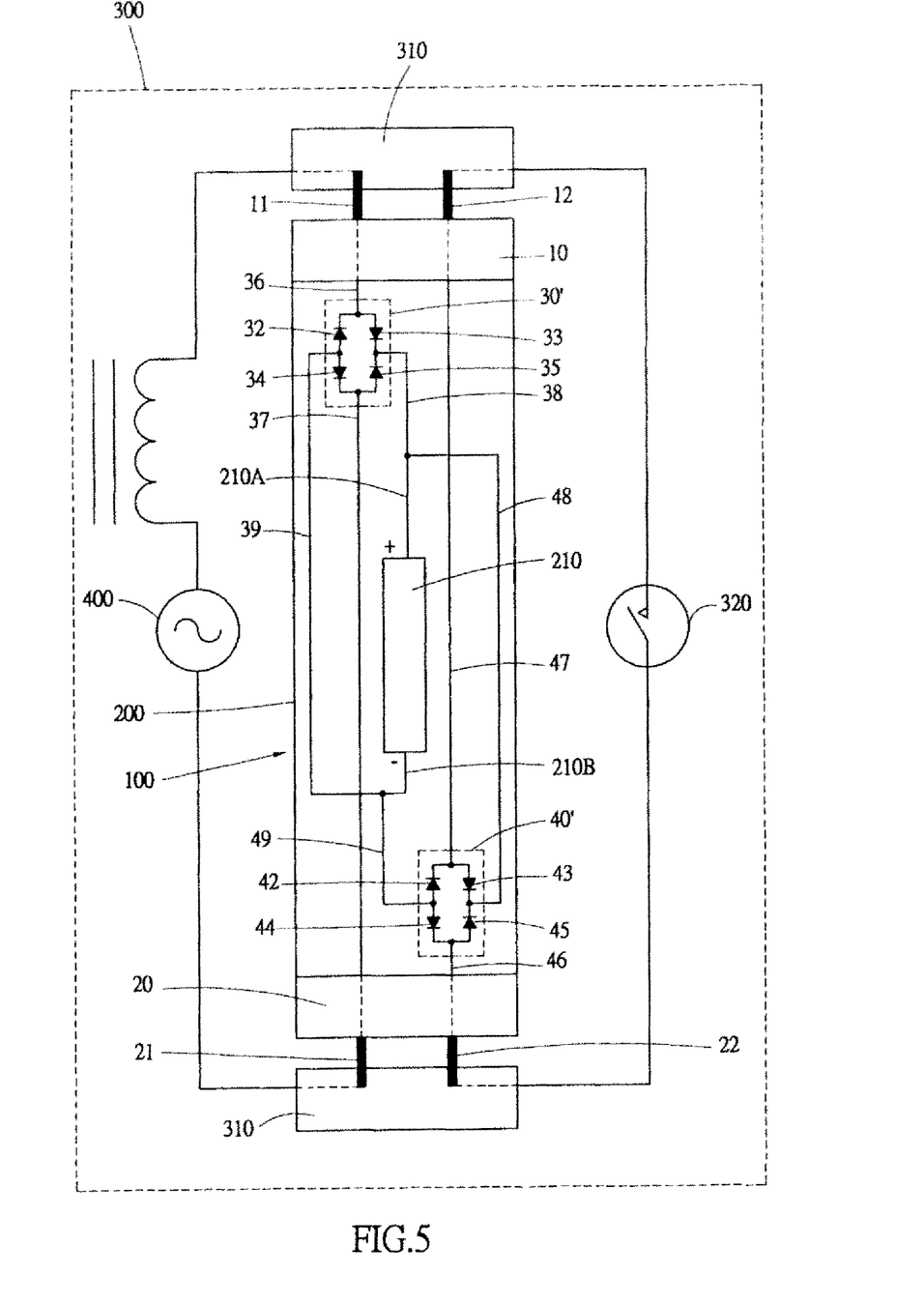
FIG. 5 is a circuit diagram showing a protection circuit of T8 LED tube according to a third embodiment of the present invention.

Referring to FIG. 5, a protection circuit 100 constructed in accordance with a third embodiment of the present invention is provided for a T8 LED lighting tube 200. In the instant embodiment, the rectification circuits 30', 40' are both full wave rectification circuits. The rectification circuit 30' is composed of a plurality of rectifier semiconductors 32, 33, 34, 35 and comprises two AC input terminals 36, 37 and a positive DC power terminal 38 and a negative DC power terminal 39. The rectification circuit 40' is composed of a plurality of rectifier semiconductors 42, 43, 44, 45 and comprises two AC input terminals 46, 47 and a positive DC power terminal 48 and a negative DC power terminal 49. The rectifier semiconductors 32, 33, 34, 35, 42, 43, 44, 45 are not limited to any specific form and in the third embodiment illustrated, rectifier diodes are taken as an example.

The two AC input terminals 36, 37 of the rectification circuit 30' are respectively connected to the contact 11 of the power transmission connector 10 and the contact 21 of the power transmission connector 20 and the positive DC power terminal 38 and the negative DC power terminal 39 are respectively connected to the positive power terminal 210A and the negative power terminal 210B of the light source load 210 contained in the T8 LED tube 200. The two AC input terminals 46, 47 of the rectification circuit 40' are respectively connected to the contact 12 of the power transmission connector 10 and the contact 22 of the power transmission connector 20 and the positive DC power terminal 48 and the negative DC power terminal 49 are respectively connected to the positive power terminal 210A and the negative power terminal 210B of the light source load 210 of the T8 LED tube 200. Further, the rectifier semiconductors 32, 34 of the rectification circuit 30' and the rectifier semiconductors 42, 44 of the rectification circuit 40' are connected through the positive DC power terminals 38, 48 and the rectifier semiconductors 33, 35 of the rectification circuit 30' and the rectifier semiconductors 43, 45 of the rectification circuit 40' are connected through the negative DC power terminals 39, 49 to collectively form a structure that prevents a reverse flow of electrical current, so as to make the positive DC power terminal 38 and the negative DC power terminal 39 of the rectification circuit 30' supplying a full-wave rectified DC power to the light source load 210 contained in the T8 LED tube 200, and with the reverse flow prevention structure formed of the plurality of rectifier semiconductors 32, 33, 34, 35, 42, 43, 44, 45, automatic isolation and disabling of the starter 320 is realized for protecting the light source load 210 of the T8 LED tube 200.

In the arrangement shown in FIG. 5, the rectification circuits 30', 40' are arranged at a position that connects between opposing contacts 11, 21 and between opposing contacts 12, 22 of the power transmission connector 10 and the power transmission connectors 20 and between the positive power terminal 210A and the negative power terminal 210B of the light source load 210.

Figure 6:
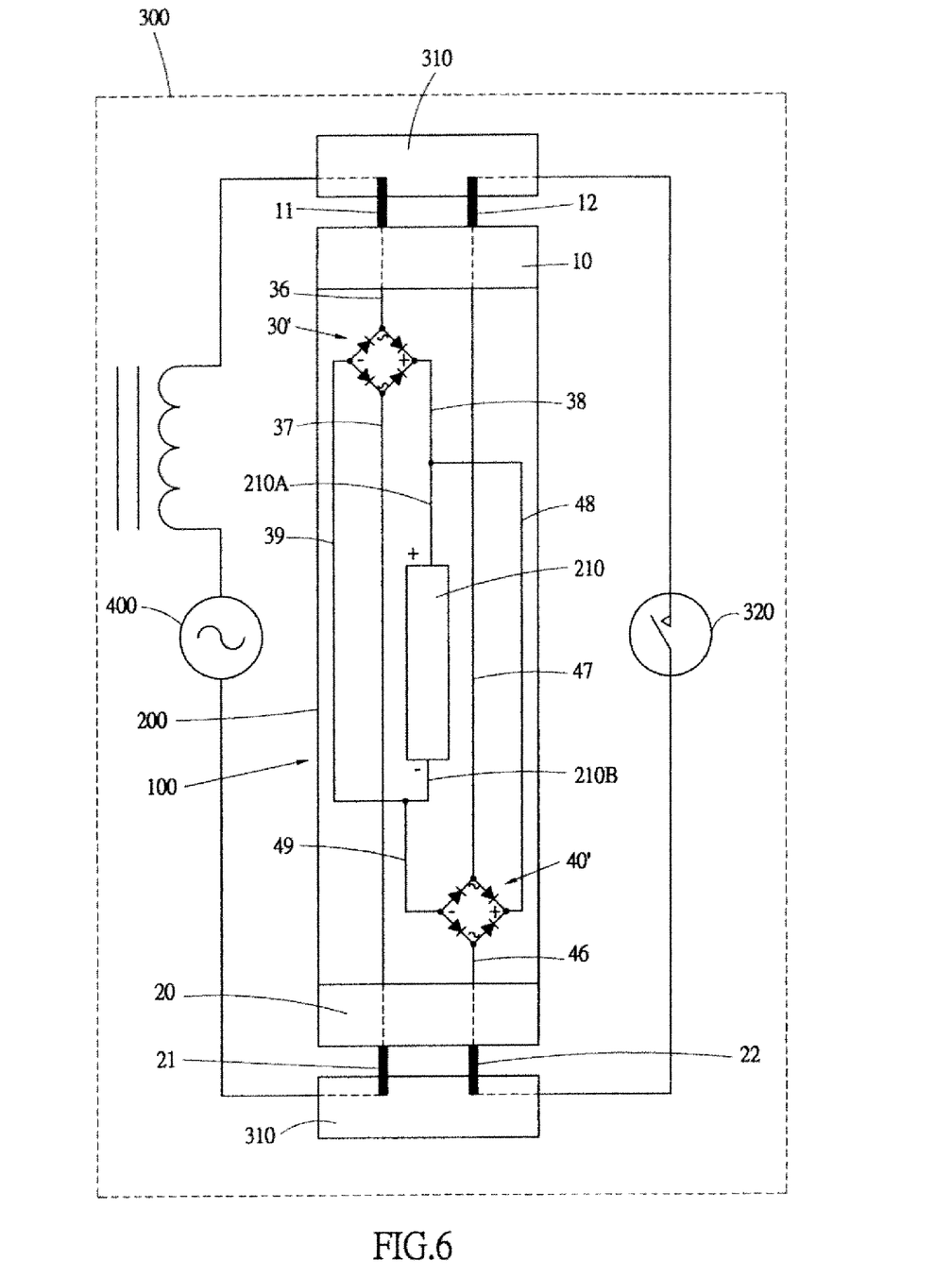
FIG. 6 is a circuit diagram showing a protection circuit of T8 LED tube according to a fourth embodiment of the present invention.

Referring to FIG. 6, a protection circuit 100 constructed in accordance with a fourth embodiment of the present invention is provided for a T8 LED lighting tube 200. In the instant embodiment, the rectification circuits 30', 40' are both full wave bridge rectification circuits. The connection arrangement among the AC input terminals 36, 37, the positive DC power terminal 38, and the negative DC power terminal 39 of the rectification circuit 30', the AC input terminals 46, 47, the positive DC power terminal 48, and the negative DC power terminal 49 of the rectification circuit 40', the contacts 11, 12 of the power transmission connector 10, and the contacts 21, 22 of the power transmission connector 20 is similar to that shown in FIG. 5, and the same function of supplying a full-wave rectified DC power from the rectification circuit 30' to the light source load 210 of the T8 LED tube 200, and automatic isolation and disabling of the starter 320 for protection of the light source load 210 of the T8 LED tube 200 can be achieved.

Figure 7:
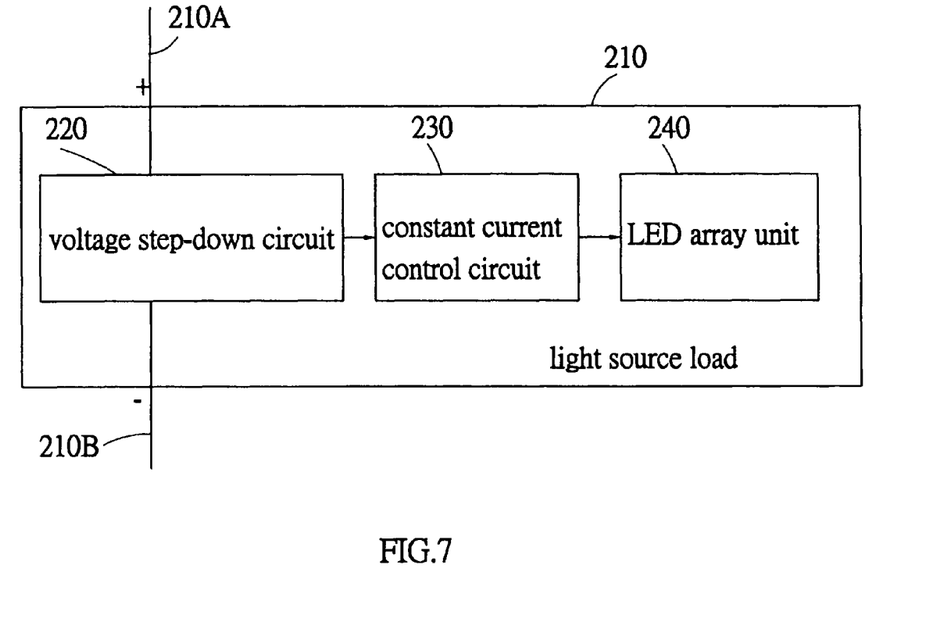
FIG. 7 is a circuit diagram showing a light source load connectable with the protection circuit of T8 LED tube according to the present invention.

Reference is further made to FIG. 7. The light source load 210 of the T8 LED tube 200 shown in FIGS. 2-6 is not limited to any specific form and in an example of the present invention, the light source load 210 comprises a voltage step-down circuit 220, a constant current control circuit 230, and at least one LED array unit 240. The voltage step-down circuit 220 is connected to the positive power terminal 210A and the negative power terminal 210B of the light source load for down conversion of the half-wave or full-wave rectified DC power supplied from the rectification circuit 30, 30' or 40, 40'. The constant current control circuit 230 is connected to the voltage step-down circuit 220 to subject the down-converted DC power from the voltage step-down circuit 220 to constant current operation. The LED array unit 240 is connected to the constant current control circuit 230, whereby the constant current control circuit 230 supplies a constant current to the LED array unit 240 for light emission.

Figure 8:
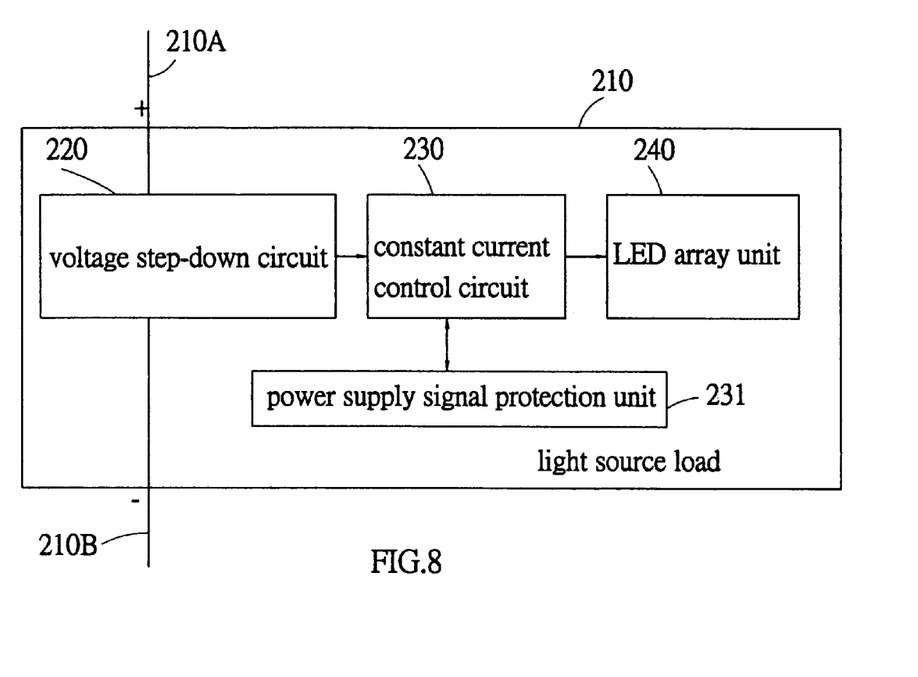
FIG. 8 is a circuit diagram showing a modified embodiment of the circuit arrangement of the light source load shown in FIG. 7.

FIG. 8 shows another embodiment of the light source load 210 different from that shown in FIG. 7. The current control circuit 230 is further connected to a power supply signal protection unit 231, which, when detecting a voltage exceeding a predetermined level of working voltage, signals the current control circuit 230 to stop driving the LED array unit 240 for light emission, in order to protect the LED array unit 240.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A protection circuit of T8 LED (Light-Emitting Diode) lighting tube, comprising:
    at least two power transmission connectors, which are respectively mounted to two ends of a T8 LED tube, each of the power transmission connectors comprising at least two contacts, which are respectively engageable with tube retention connectors formed on opposite ends of a T8 fluorescent light fixture to establish electrical connection with an external alternating current power source; and
    at least two rectification circuits, each of which comprises at least one rectifier semiconductor, the rectification circuits being respectively connected to the contacts of the power transmission connectors and also respectively connected to a positive power terminal and a negative power terminal of a light source load of the T8 LED tube that is connected to the power transmission connectors, the rectifier semiconductors of the rectification circuits being connected to each other to form a reverse flow prevention structure, whereby the rectification circuits selectively converts an alternating current power supplied from the external alternating current power source through the power transmission connectors into a direct current power supplied to the light source load, and isolates and disables a starter of the T8 fluorescent light fixture connected to the power transmission connectors.

2. The protection circuit as claimed in claim 1, wherein the rectification circuits comprise half-wave rectification circuits.

3. The protection circuit as claimed in claim 1, wherein the rectification circuits comprise full-wave rectification circuits.

4. The protection circuit as claimed in claim 3, wherein each of the full-wave rectification circuits comprises two AC input terminals, a positive DC power terminal, and a negative DC power terminal.

5. The protection circuit as claimed in claim 1, wherein the full-wave rectification circuits comprise full-wave bridge rectification circuits.

6. The protection circuit as claimed in claim 1, wherein the rectification circuits are arranged at a position that connects between diagonally located ones of the contacts of the two power transmission connectors and the light source load is connected between the rectification circuits.

7. The protection circuit as claimed in claim 1, wherein the rectification circuits are arranged at a position that connects between opposing ones of the contacts of the two power transmission connectors and the light source load.

8. The protection circuit as claimed in claim 1, wherein the rectifier semiconductors of the rectification circuits comprise rectifier diodes.

9. The protection circuit as claimed in claim 1, wherein the light source load connected to the rectification circuits comprises:
    a voltage step-down circuit, which down converts a DC power supplied from the rectification circuits to form a down-converted DC power;
    a constant current control circuit, which is connected to the voltage step-down circuit for subjecting the down-converted DC power from the voltage step-down circuit to constant current operation; and
    an LED array unit, which is connected to the constant current control circuit so that the constant current control circuit supplies a constant current to the LED array unit for light emission.

10. The protection circuit as claimed in claim 9, wherein the constant current control circuit is connected to a power supply signal protection unit.

* * * * *